(No Model.)
S. McLEAN.
COMBINED PLOW AND FERTILIZER DISTRIBUTER.
No. 446,389. Patented Feb. 10, 1891.
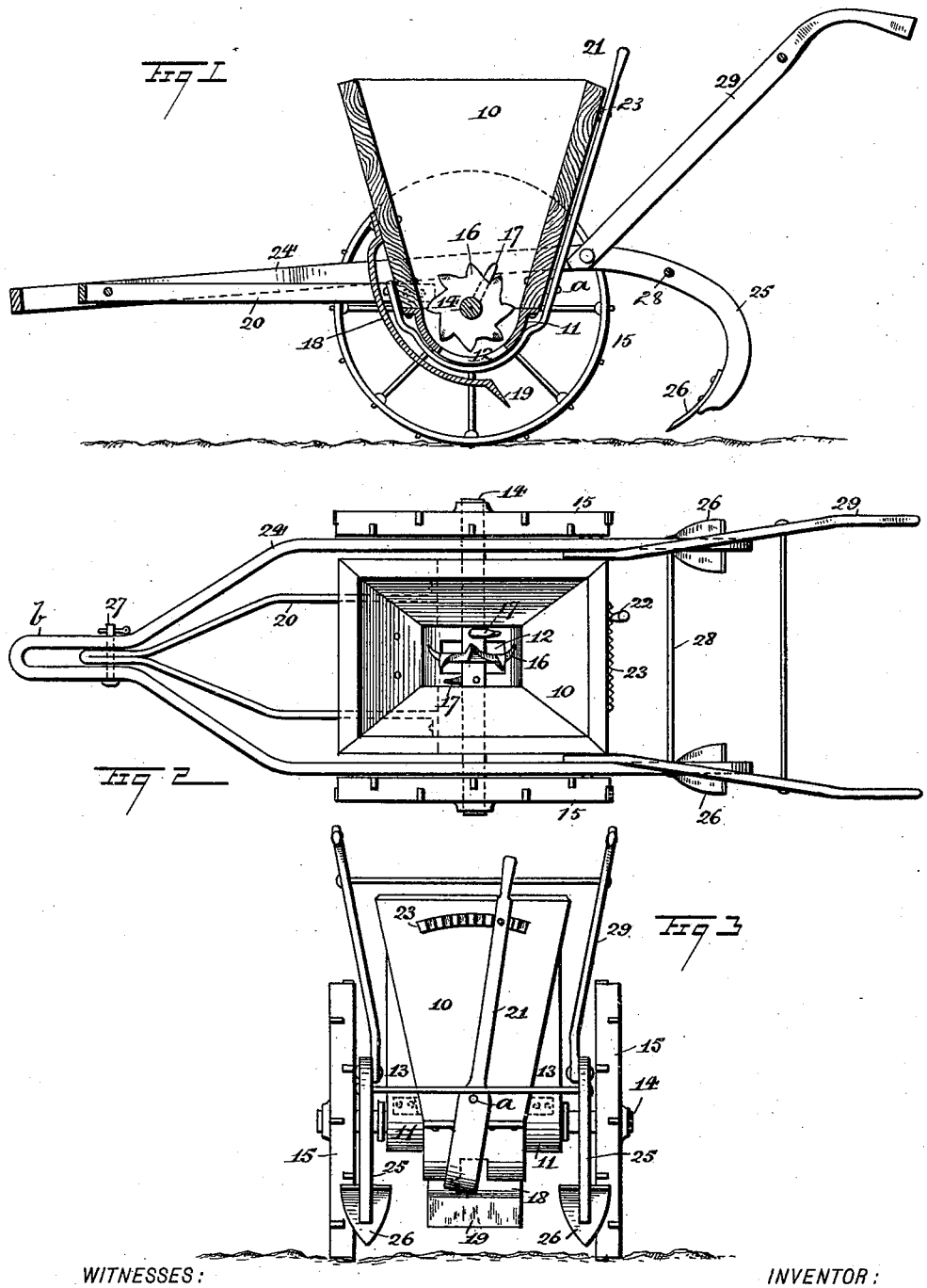
WITNESSES:
H. Walker
C. Sedgwick
INVENTOR:
S. McLean
BY Munn & Co.
ATTORNEYS

UNITED STATES PATENT OFFICE.

SILAMON McLEAN, OF MINERAL SPRINGS, SOUTH CAROLINA, ASSIGNOR OF ONE-HALF TO BROWN McCALLUM, OF SAME PLACE.

COMBINED PLOW AND FERTILIZER-DISTRIBUTER.

SPECIFICATION forming part of Letters Patent No. 446,389, dated February 10, 1891.

Application filed May 23, 1890. Serial No. 352,895. (No model.)

*To all whom it may concern:*

Be it known that I, SILAMON McLEAN, of Mineral Springs, in the county of Marion and State of South Carolina, have invented a new and useful Improvement in a Combined Plow and Fertilizer-Distributer, of which the following is a full, clear, and exact description.

My invention relates to a combined plow and fertilizer-distributer, and has for its object to distribute either damp or dry fertilizer and to provide a machine which will be capable of equally distributing the material over the bottom of the furrow and thoroughly incorporating it into the soil.

Another object of the invention is to so construct the implement that the weight of the fertilizer will not be sustained in the slightest degree by the plows, whereby the latter are rendered completely under the control of the operator and can be made to run light or deep, as desired.

A further object of the invention is to provide a simple device for expeditiously and accurately regulating the discharge of the fertilizer, and to so form the several parts of the implement that the plows and their frame may at any time be detached from the distributer and employed for any purpose for which double-shovel plows may be required.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a central vertical section through the implement. Fig. 2 is a plan view thereof, and Fig. 3 is a rear elevation of the implement.

The fertilizer-distributer consists of a hopper 10, preferably somewhat funnel-shaped, the bottom being of less area than the top. The body of the hopper is essentially rectangular in cross-section, and the bottom 11 thereof is ordinarily made semicircular and provided with a lower centrally-located radial slot or opening 12. At each side of the hopper a stay or brace beam 13 is preferably secured, and in the lower end of the said stay or brace beam, and likewise in the side of the body of the hopper, an axle 14 is journaled, the axle being made to extend some distance beyond the outer faces of the stay or brace beams 13, and to the extremities of the axle the drive-wheels 15 are secured, which wheels may be of any suitable or approved construction.

Within the hopper upon the axle a feed-wheel 16 is rigidly secured, the said wheel being located immediately above the opening 12 of the hopper, and the teeth of the said wheel are laterally twisted or inclined alternately in opposite directions, as is best illustrated in Figs. 1 and 2, and at each side of the feed-wheel a finger 17 is secured to the axle, the said fingers being made to radiate therefrom in opposite directions and being adapted for use as stirrers and to assist the feed-wheel in breaking the fertilizer placed in the hopper and delivering it through the opening 12.

Preferably to the front face of the hopper the upper end of a spreader-table 18 is secured, which table is curved downward beneath the slotted bottom of the hopper, and the lower end of the table is carried at a sharp inclination downward, as illustrated at 19 in Fig. 1. This table is usually constructed of a light spring metal, and is preferably of a width corresponding with the width of the hopper at its bottom, and the spreader-table being constructed of a spring material a vertical vibratory movement will be imparted thereto as the implement is drawn forward, and the material in the hopper falling upon the table is thereby spread equally upon the bottom of the furrow over which the implement is drawn.

To the sides of the hopper the members of a yoke-like tongue 20 are secured, the outer end of the said tongue being flattened or contracted, as is best shown in the plan view, Fig. 2. The amount of material to be distributed is regulated by a cut-off lever 21, one end of which lever is secured to the front central portion of the body of the hopper at or near its lower end, and the said lever is thence carried beneath the bottom section 11 of the hopper below the opening 12 therein and up parallel with the back of the hopper, extending, preferably, above the latter, as is best shown in Figs. 1 and 3. The lever 21 is pivoted also to the back of the hopper, as illustrated at *a* in Figs. 1 and 3, and the upper end of the hopper is provided with an attached or integral tooth 22, adapted to enter the spaces intervening the teeth of a rack 23, attached to the back of the hopper at or near its top. The lever may be shifted laterally, so as to entirely uncover the opening 12, to partially uncover the said opening, or to completely close the same. Thus the delivery of the material may be regulated at will by the operator in an expeditious and convenient manner.

The plow-frame 24 is essentially yoke-shaped, the rear ends of the members being curved downward and forward to form shanks 25, and to said shanks 25 double-shovel plows 26 are preferably secured, although other plows may be substituted, if desired. The forward end of the plow-frame 24 is contracted, as illustrated at *b* in Fig. 2, and in the contracted end of the plow-frame the corresponding end of the yoke-like tongue 20 of the distributer is pivoted, preferably by means of a detachable pin 27. The members of the plow-frame near their rear ends are connected by a suitable brace-rod 28, and to the said members the usual form of handle 29 is secured.

It will be observed that the fertilizer distributer or hopper is entirely independent of the plow-beam, although the two are connected to co-operate, and that the distributing-section of the implement sustains all the weight of the fertilizing material carried; also, that the plows may be raised or lowered at the will of the operator and as the character of the ground may demand. It will be further observed that when the distributer is not required by removing the pin 27 the plow-frame is freed, and the plows may be employed for the usual work.

Having thus described my invention, I claim as new and desire to secure by Letters Patent—

1. The combination, with the fertilizer-hopper having a curved bottom provided with an outlet, of the lever 21, pivoted to the outside of the hopper to swing laterally and having a lower curved portion embracing the curved bottom of the hopper and crossing its outlet, and means for holding said lever in any desired position, substantially as set forth.

2. The combination, with the hopper having a curved bottom provided with an outlet, of a curved spreader-table 18, projecting under the hopper and inclined at its inner edge, of a lever 21, having a lower curved portion pivoted to the hopper and working laterally in the space above the table 18, and means for locking the upper end of the lever, substantially as set forth.

3. In a machine of the character described, the combination, with a downwardly-tapering hopper having an opening in its bottom, a spring-table attached to one side of the hopper and extending downward beneath the opening therein, and a cut-off lever pivoted to the hopper and capable of sliding laterally beneath the opening between it and the table, of an axle journaled in the hopper, drive-wheels secured to the extremities of said axle, and a feed-wheel secured to the axle within the hopper over the opening, the teeth of which feed-wheel are alternately laterally bent in opposite directions, substantially as shown and described.

4. In a machine of the character described, the combination, with a tapering hopper having a cylindrical bottom and an opening in said bottom, a spring-table attached to one side of the hopper and extending beneath the opening in the bottom, the lower end of said table being downwardly inclined, and a cut-off lever pivoted to the hopper capable of sliding over the opening between said hopper and the table, of an axle journaled in the hopper, drive-wheels secured to the extremities of the said axle, a feed-wheel attached to the axle within the hopper, the teeth whereof are alternately twisted in opposite directions, and stirrer-fingers radiating from the axle within the hopper in opposite directions, as and for the purpose specified.

5. In a machine of the character described, the combination, with a fertilizer-distributing hopper, an axle journaled in the hopper, drive-wheels secured upon the ends of the axle, an agitator attached to the axle within the hopper, and a tongue projected from the forward portion of said hopper, of an essentially yoke-shaped plow-frame detachably pivoted to the forward end of the hopper-tongue, the members of which frame are carried rearward, one at each side of the hopper, over the axle and downwardly and forwardly curved, plow-blades attached to the curved extremities of the members of the plow-frame, and handles also attached to the said members, substantially as shown and described, whereby the weight of the material to be distributed is sustained entirely by the distributer and the plows are free to be moved up or down, as specified.

6. In a fertilizer-distributer, a stirring-wheel or agitator formed of a disk having its periphery notched to form teeth, said teeth being bent outward alternately in opposite directions, substantially as set forth.

SILAMON McLEAN.

Witnesses:
ROBERT T. BARFIELD,
PRESLEY MANGUM.